United States Patent [19]
Prewarski et al.

[11] 3,929,284
[45] Dec. 30, 1975

[54] PROGRAMMABLE TIMER MECHANISM

[76] Inventors: Mike Prewarski, 3432 Lansdowne Drive; Edward Mills, 3415 Thistletow Drive, both of, Lexington, Ky. 40502

[22] Filed: July 25, 1974

[21] Appl. No.: 491,635

[52] U.S. Cl. .................... 236/46; 165/12; 236/47
[51] Int. Cl.² .......................................... G05F 23/19
[58] Field of Search ........ 236/47, 46; 337/302, 303; 165/12

[56] References Cited
UNITED STATES PATENTS
1,985,986  1/1935  Hall .................................. 236/46 X

*Primary Examiner*—William E. Wayner
*Attorney, Agent, or Firm*—Stevens, Davis, Miller & Mosher

[57] ABSTRACT

A programmable timer mechanism for a dual temperature thermostat having high and low temperature settings. The mechanism includes two programmable members, each controlling, for a first predetermined period, the time in which the "high" thermostat is effective to maintain a desired temperature and, for a second predetermined period, the time in which the "low" thermostat is effective to maintain a desired temperature. One programmable member may correspond to a weekday life cycle of the occupant of a building to maintain high and low temperatures at appropriate times while the other member may correspond to a weekend life cycle to maintain such high and low temperatures at appropriate times. Automatic and manual switches are provided for activating the programmable members.

6 Claims, 10 Drawing Figures

PROGRAMMABLE TIMER MECHANISM

BACKGROUND OF THE INVENTION

This invention relates to a programmable timer system and, more particularly, to a programmable timer mechanism for regulating a dual temperature thermostat.

In view of the scarcity of fuels and the increased cost of producing and using them, energy conservation is of prime importance to everyone. The wasteful use of energy is no more exemplified than when fuel is used in a heating or cooling system to heat or cool a building at times when the serviced area is unoccupied or when heating or cooling is not required.

In an attempt to conserve fuel, thermostats may be manually lowered in a home during, for example, the sleep hours or whenever the residence is unoccupied, and then raised during the awake hours when the house is occupied. The problems with manually lowering and raising the temperature setting of a thermostat are, when the heating system is used, (1) forgetting to lower the temperature setting at night or (2) experiencing the discomfort of having to wake up when it is cold or (3) returning to a cool dwelling. During the warm weather months when the cooling system is used, discomfort may be experienced in having to return to a warm dwelling because the thermostat of the unoccupied home was set high.

Because of this discomfort and the time lag required to bring the internal environment to a comfortable level, many people neglect, forget or altogether omit lowering or raising the thermostat during the heating or cooling seasons at appropriate times. Those who do remember probably do not lower or raise the temperature as much as they possibly could to prevent too much discomfort. Consequently, much of the energy used is wasted in heating residences, offices, other places of business, schools, etc. to, for example, a comfortable temperature level of 68°F to 72°F when it is possible to maintain standby temperatures of, for example, 58°F to 62°F.

The present invention solves the problem of maintaining a comfortable temperature when required and a standby temperature when the former is not needed. This problem is solved with the use of a programmable timer mechanism which makes it possible to program the temperature settings of a dual or multi-temperature thermostat to the life cycle of occupants of a building.

SUMMARY OF THE INVENTION

It is an object of the present invention to provide a programmable timer mechanism for controlling the time during which a controlled member functions.

It is another object to provide a programmable dual temperature control system for regulating the temperature in a building in accordance with the life cycle of the occupants.

It is a further object to employ a program on a rotating cylinder or disc in which the program may be easily modified to change the time a particular temperature setting of a thermostat is effective to control temperature.

A still further object of the present invention is to employ a programmable timer mechanism in which a programmable disc or cylinder may be easily interchanged with another disc to provide different programs.

Another object of the present invention is to provide a programmable timer mechanism having two active programs, one for workdays and one for non-workdays and to be able to select one of the two programs either manually or automatically.

Another object is to provide a manual override selection switch to override the programs.

A still further object of the present invention is to provide a programmable timer mechanism which may easily store three programmable discs or cylinders, two of which are active and the third being a standby program.

Finally, an object of this invention is the provision of a programmable timer mechanism complete with two thermostats, or with a single thermostat for installation with an existing thermostat in a building or merely the programmable timer mechanism itself which may be easily installed with two existing thermostats.

DETAILED DESCRIPTION OF THE INVENTION

Figure 1:
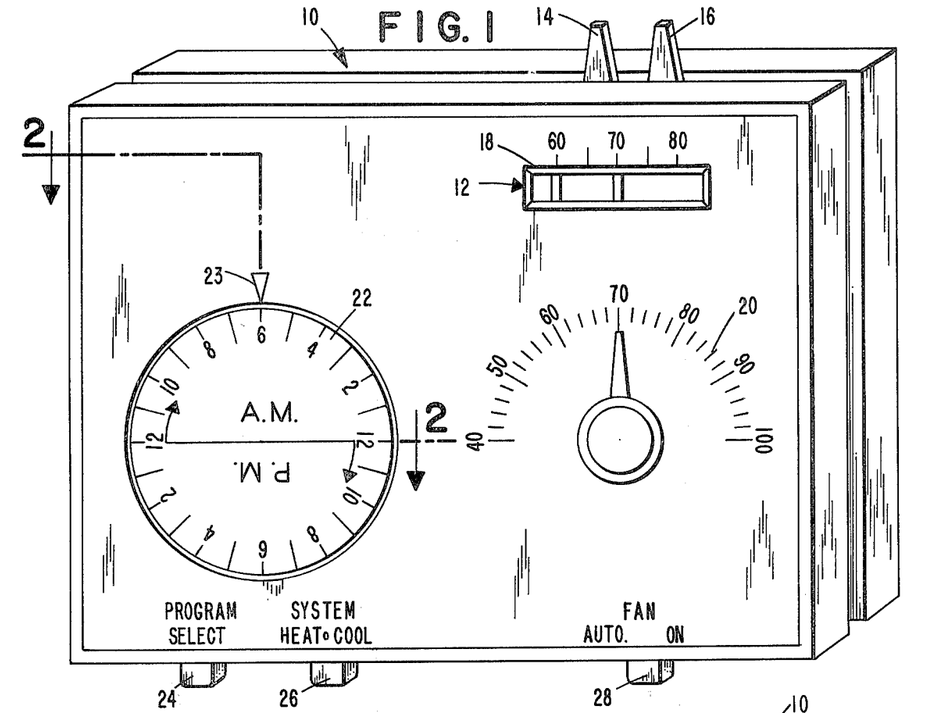
FIG. 1 is a perspective of a programmable dual temperature control system of the present invention.

FIG. 1 shows a split casing 10 for the programmable dual temperature control system including a dual temperature thermostat 12 having two temperature setting levers 14, 16 for setting, respectively, low and high temperature levels as shown on an index 18 to control temperature of a zone such as for example a house. Also illustrated is a standard thermometer 20 for indicating the temperature of the building. Casing 10 houses a rotatable clock face 22 which indicates via indicator 23 the time of day, and a plurality of switches including a switch 24 to manually select a particular program, a system heat-cool switch 26 for turning on either the heating or cooling system of the building, and a fan switch 28 having an "auto" or "on" position for automatically periodically turning on the blower fan or maintaining it continuously on as is well known. The casing is split so that air may flow over a motor located within the casing to cool it. The circulating air is needed for the temperature sensing elements to make the temperature control system accurate.

Assume that the device of FIG. 1 is used in a home. The occupant would set each lever 14, 16 to the desired low and high temperatures which are suitable for his life cycle. For example, during the hours that the occupant is awake and in the home, he may desire a comfortable temperature level of 70°F, whereas during the non-waking hours or while the residence is not occupied, a temperature of only 60°F may be required. Consequently, the levers 14, 16 will be set to 60°F and 70°F, respectively. As will be more fully described, the programmable timer mechanism of the present invention has at least one program that switches in circuit one of the settings of lever 14 or 16 at predetermined times to control the temperature of the premises in accordance with the left cycle of the occupants.

Figure 2:
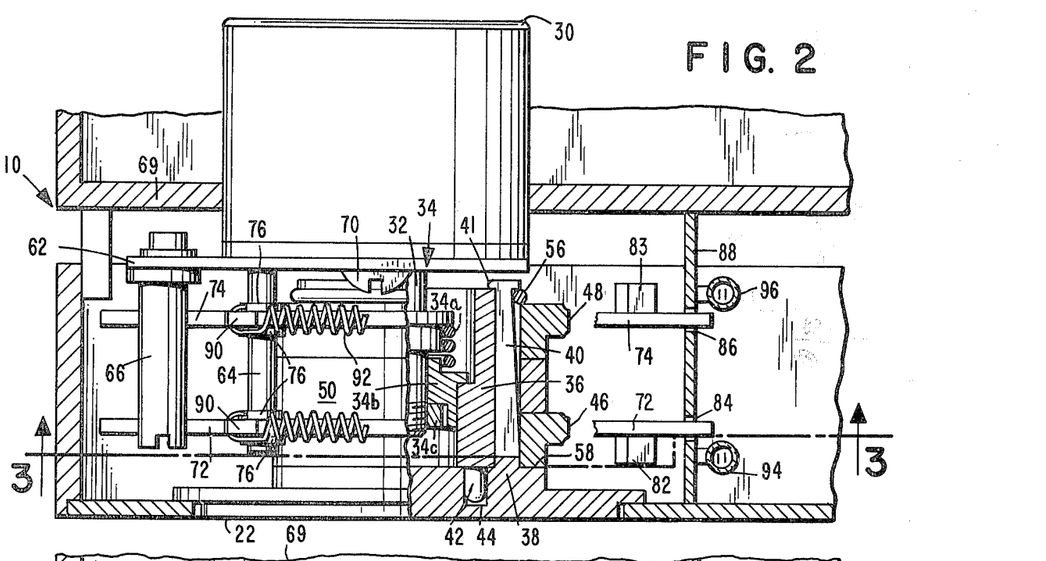
FIG. 2 is a section taken along lines 2—2 of FIG. 1.
Figure 3:
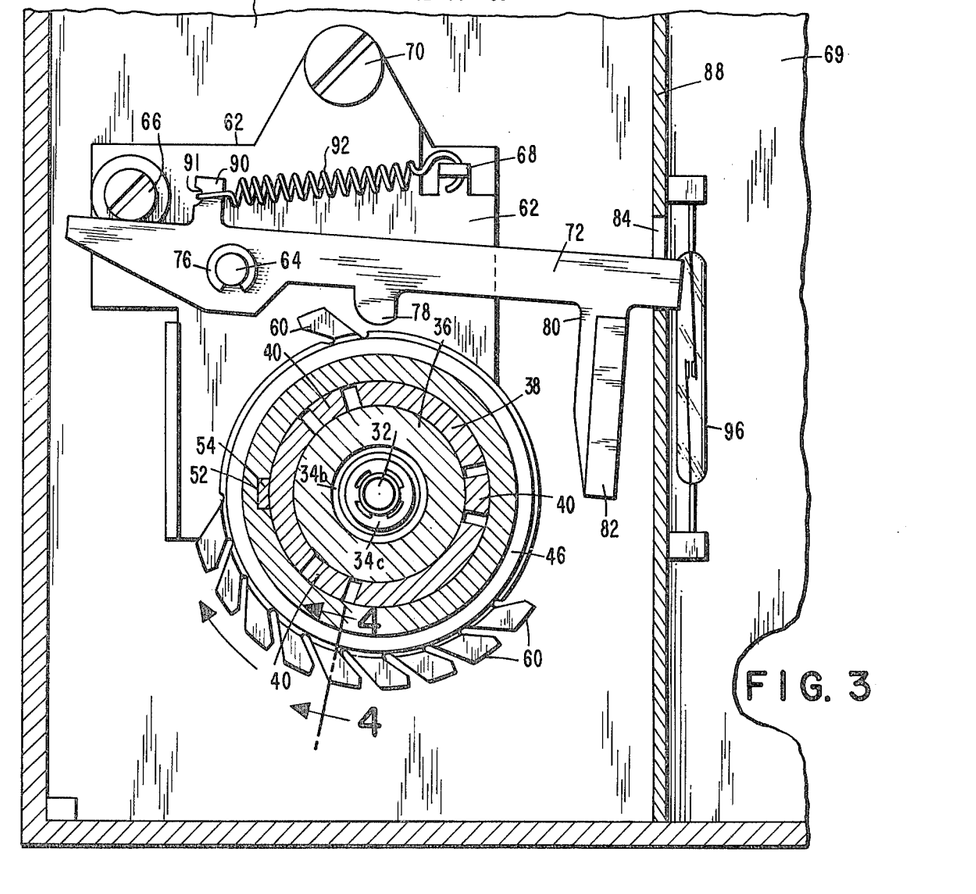
FIG. 3 is a section taken along lines 3—3 of FIG. 2.

As illustrated in FIGS. 2–3, the programmable timer mechanism includes a synchronous motor 30 which rotates an output shaft 32 through suitable gearing (not shown) at one revolution per 24 hour period or 1/1440 R.P.M. A one-way spring clutch 34 including a spring 34a, spring arbor 34b and retaining nut 34c is rotatably connected to the motor 30 to protect it by limiting the maximum output torque. Pressed on the spring clutch arbor 34b is a rotatable hub 36 which receives a mounting disc 38 whose outer end has the clock face 22 located thereon.

Mounting disc 38 is pressed onto the hub 36 by sliding the former over the latter. Disc 38 is retained on the hub 36 to rotate therewith by three deflectable fingers 40 equiangularly spaced about the disc 38 and each having a flange 41 to hook onto the back end of the hub 36. The forward end of hub 36 has a protrusion 42 which fits into an aperture 44 in the mounting disc 38 to further ensure rotation of the hub with the disc.

Located about the mounting disc 38 are two programmable discs 46, 48 which are separated by a spacer 50 all of which rotate with the mounting disc 38. Each of the programmable discs 46, 48 and the spacer 50 has a groove 52 into which fits a key 54 located on the disc 38 in the longitudinal direction to provide angular registration between the two for reasons more fully described below. A C-shaped retaining ring 56 is positioned about the inner end of mounting disc 38 and retains the programmable discs 46, 48 and spacer 50 against a shoulder 58 near the other end of disc 36. Each programmable disc 46, 48 includes a series of segments or cams 60 spaced about their periphery.

The programmable timer mechanism also includes a metallic mounting plate 62 through which the shaft 32 of the motor projects. Extending from plate 62 are a stationary shaft 64, an eccentrically mounted stud 66 and a projection 68. Mounting plate 62 may be mounted to a frame 69 by several screws such as screw 70.

A pair of levers or rocker arms 72, 74 are rotatably mounted on the shaft 64 with C-shaped clips 76 located on both sides of each of the arms 72, 74. Each rocker arm 72, 74 includes a cam follower 78 located in the central portion of the arm and a downwardly extending projection 80 near one end having mounted thereon a respective permanent magnetic 82 or 83. This one end of each of the arms 72, 74 extends through respective guide slots 84, 86 located in a board 88 secured in case 10. Each rocker arm 72, 74 also includes an upwardly extending flange 90 having a groove 91. One end of a spring 92 is connected within the groove 91 while the other end of the spring 92 is connected to projection 68 in a similar type groove (not shown), there being one spring 92 for each rocker arm 72, 74. Each spring 92 biases the arm 72, 74 in a clockwise direction to cause the other end of the arms to rest against the stud 66 in their normal position. Connected on the other side of the board 88 are two normally open reed switches 94, 96 associated with each respective magnet 82, 83.

As will be more fully described, one of the reed switches 94, 96 is closed when the respective magnet 82, 83 is brought into proximity with the switch to complete a circuit for control of the internal temperature of a building in accordance with the thermostat settings produced by levers 14, 16. In this specific embodiment, one programmable disc, for example, disc 46 may be programmed for the weekday life cycle of the user of a building while the other programmable disc 48 may be programmed for the weekend life cycle. As will be described, either automatic or manual means are provided for activating or selecting one of the programs to control the thermostats for the weekday or weekend life cycle.

In operation, as the motor 30 rotates once each day, programmable discs 46, 48 will also rotate in a clockwise direction. As, for example, disc 46 rotates, a cam 60 will impart an oscillating or rocking motion to rocker arm 72 as the cam follower 78 rides up a side of the cam 60 and will then dwell on the top surface of the cam. The rocker arm 72 will therefore rotate in a counterclockwise direction about shaft 64 and against the force of spring 92 to move the magnet 82 into proximity with the reed switch 94. As a result, the contacts of reed switch 94 will close to energize a circuit activating, for example, the high temperature setting of the thermostat 12. At the same time, disc 48 will be rotating and may have a cam 60 which comes into contact with the cam follower of rocker arm 74 to move the latter also in a counterclockwise direction. This will bring magnet 83 into proximity with its associated reed switch 96 to close the switch contacts; however, assuming the weekday life cycle is desired, the automatic means noted above will maintain open the circuit controlled by reed switch 96.

Figure 4:
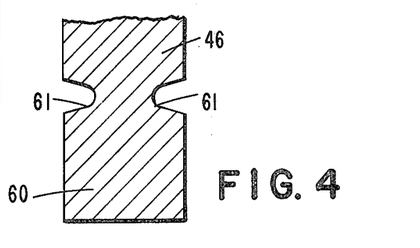
FIG. 4 shows a section taken along lines 4—4 of FIG. 3.

Each of the programmable discs 46, 48 may include 24 or 48 equally spaced segments 60 about the periphery of the discs with each cam segment having a notch or undercut 61 near their root as shown in FIG. 4. As will be appreciated, if 24 segments 60 are used then each will correspond to a one hour time period whereas if 48 are employed each will represent a half hour time period. In order to program the present invention to the desired life cycle, each of the discs 46, 48 including the segments 60 may be made of plastic and, when manufactured, would include 24 or 48 segments. Since each of the segments includes the notch 61, the occupant may easily break off one or more of them. Thus, if during the weekday cycle in the evening hours a high temperature setting of 70°F is required, then the segments 60 corresponding to those hours are retained on the disc 46 while if during the non-waking early morning hours a low temperature setting is to be maintained, then the segments 60 are removed. In this manner, during such evening hours, the segments 60 remaining on the disc 46 will rotate the arm 72 and activate the thermostat corresponding to 70°F. During the early morning hours, the lever 72 will be biased clockwise by the spring 92, thereby removing the magnet 82 from the proximity of the reed switch 94, and opening the contacts of the latter to activate the thermostat corresponding to 60°F. As may be appreciated, any desirable program may be obtained for either the weekday or weekend life cycle by merely removing the appropriate segments 60.

As noted above, the present invention may be commercially manufactured with the two programmable discs 46, 48 having 24 or 48 serrations located thereon.

To obtain the desired program the user of the invention may easily slide the mounting disc 38 off the hub 36 since the flange 41 of deflectable fingers 40 will deflect free of the inner end of hub 36 against the force of retaining ring 56. Ring 56 is then first removed from mounting disc 38. Then discs 46, 48 as well as spacer 50 are removed by sliding them off of key 54. The appropriate segments 60 may then be easily snapped off to provide the particular programs for a given life cycle. For re-assembly, the discs 46, 48 and spacer 50 are then placed on mounting disc 38 by sliding them on the key 54, with the ring 56 then connected about disc 38. To complete the re-assembly, the user then slides disc 38 over hub 36 making sure that protrusion 42 fits into aperture 44.

Key 54 may be located, for example, in relation to the 12:00 Noon position of clock face 22. The user would then remove the segments 60 with this reference point, and when the discs 46, 48 are re-assembled on disc 38 the key 54 will provide proper angular registration. That is, those segments which remain will be aligned with the time of day indicated on clock face 22. After the disc 38 and attached clock face 22 are re-assembled on hub 36, the face 22 may be manually rotated to locate an hour number on face 22 opposite index 23 in accordance with the correct time of day.

The programmable timer mechanism has been described employing a spacer 50. However, a third programmable disc may be used in lieu of spacer 50. This will mean that a standby program is conveniently stored and ready to be used if, for example, the weekday life cycle changes. The user merely programs the stored disc to the new cycle and reverses the positions of the stored disc and disc 46.

Stud 66 is employed both as a stop for the clockwise movement of the rocker arms 72, 74 to prevent the cam follower 78 from contacting the periphery of the disc 46 when not riding on the top surface of a cam 60 thereby avoiding undue wear, and to facilitate removal of the disc 38. When the eccentric stud 66 is rotated to its extreme low point, the arms 72, 74 and particularly cam followers 78 will be rotated counterclockwise completely free of the segments 60. This will permit the removal of discs 46, 48 without interference with the arms 72, 74 as the disc 38 is pulled off the hub 36.

There are other advantages and features of the apparatus shown in FIGS. 2-3 which should be mentioned at this time. As noted above, the programmable timer mechanism utilizes permanent magnets and reed switches to switch in the dual thermostats rather than switches which require a strong mechanical force to close them. Accordingly, only a small motor is needed to rotate the cams 60, resulting in movement of arms 72, 74 and closure of the reed switches, whereas a relatively large motor would have to be employed if those mechanical forces had to be overcome. In view of the low loads on the motor of the present invention, there is relatively little heat produced which minimally affects the temperature actuated thermostats. In addition, reed switches are very reliable and this makes them adequate for more than a million cycles. Furthermore, the mounting plate 62 acts as a heat sink for the motor 30 thereby dissipating what minimal amount of heat is generated by the motor.

A further important feature relates to the magnets 82, 83 and the manner in which they approach the respective reed switches 94, 96. Each of the magnets 82, 83 is oriented lengthwise in relation to the respective reed switches 94, 96 and is offset on the rocker arms 72, 74 from the axis of rotation about shaft 64. Consequently, as a particular segment 60 comes into contact with the cam follower 78, magnet 82, for example, is caused to move arcuately in a direction up and towards the reed switch 94 as viewed in FIG. 3. It has been found that orienting and offsetting the magnet in this manner makes the reed switch significantly more sensitive to the magnetic field produced by the magnet and hence makes the switch more sensitive to closing and dropping out or opening. That is, the magnet 82 need only move a small distance to bring the magnetic field in a position to close or open the reed switch 94. By keeping the total displacement of the magnets 82, 83 relatively small, the dimensions of the serrations 60 may be made relatively small, i.e., cam follower 78 need only ride up a relatively small side of cam 60 to place the magnet in a switch closure position. This in turn means that a relatively small programmable timer mechanism may be employed together with a large number of cams such as 24 or 48. Accordingly, through the use of this large number of cams, the desired thermostat setting may be switched in at almost precisely the time required.

This sensitivity of the reed switches aids in other ways to provide a programmable disc of the present invention. Because of the direction of movement of the magnet 82, once the reed switch 94 is closed, it will not open until the cam follower 78 drops down to a position near the periphery of disc 46 where the cams 60 are attached, as shown in FIG. 3. The switch 94 will not open when the follower 78 drops only a small distance when traveling between adjacent cams 60 shown on the lower part of disc 46 of FIG. 3; that is the follower will not drop to such periphery of disc 46. This means that separate serrations or cams may be provided which may be broken off to develop a particular program, yet adjacent segments 60 may in effect act as a continuous cam to close switch 94 for an extended period of time.

Finally, the design of the present invention is such that the motor 30 is positioned away from the magnets 82, 83 and the other elements such as hub 36, discs 38, 44, 48, spacer 50 and arms 72, 74 may be made of non-magnetic material. This will reduce or prevent any effect these elements might have on the magnetic field generated by magnets 82, 83.

FIGS. 5-8 show a modified embodiment in which is disclosed an automatic means for selecting either the weekend or weekday program of respective discs 46, 48. In lieu of the spacer 50, mounted on the disc 38 is a disc 95 having two cams or lobes 96, 98 located diagonally opposite from one another. The lobes are spaced to represent 12 o'clock Noon and 12 o'clock Midnight, respectively.

A third rocker arm 100 has a cam follower 102 extending downwardly in the middle portion thereof and one end extending through a third aperture 104 in the board 88, the other end being located in proximity to the eccentric stud 66. The rocker arm 100 is spring biased in a clockwise direction by a spring 106 connected between the projection 68 and an upwardly extending projection 108 of the arm 100 similar to springs 92.

Figure 5:
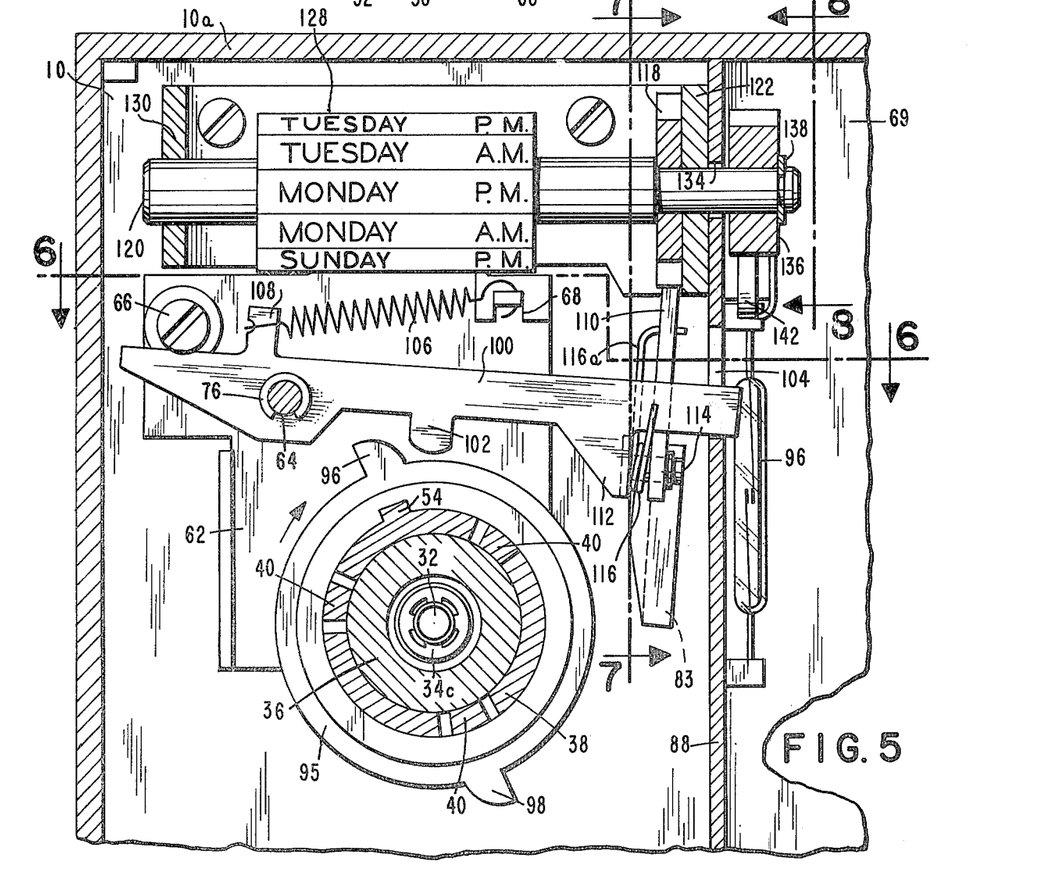
FIG. 5 is a view similar to FIG. 3 illustrating a modified form of the invention.
Figure 6:
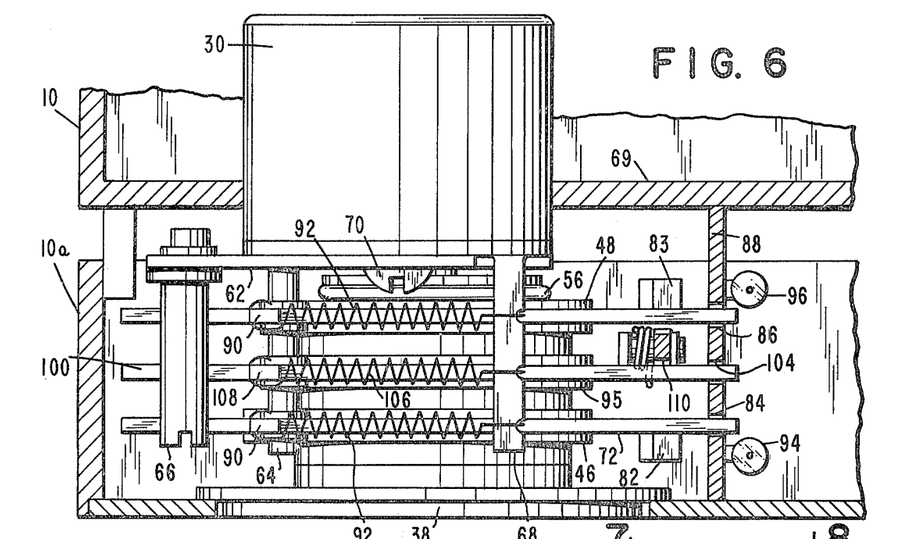
FIG. 6 is a view similar to FIG. 2 taken along lines 6—6 of FIG. 5.
Figure 7:
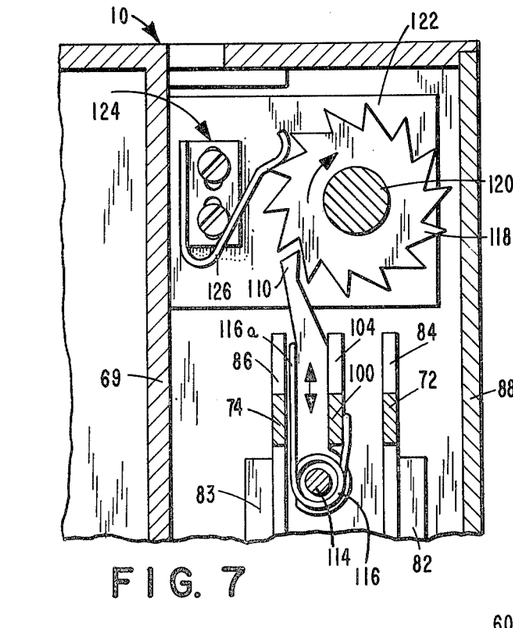
FIG. 7 is a section taken along lines 7—7 of FIG. 5.
Figure 8:
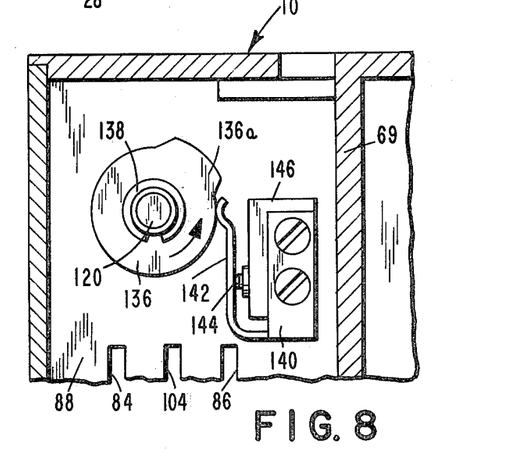
FIG. 8 is a side elevation taken along lines 8—8 of FIG. 5.

As shown in FIGS. 5-7, connected near the one end of the arm 100 is an index pawl 110 which is coupled to a depending flange 112 of the arm 100 via a stud 114. A torsion spring 116 is connected about the stud 114 and has an upwardly extending portion 116a which rests against the pawl 110 to bias the latter against the rocker arm 100.

Index pawl 110 is arranged to engage a tooth of an index wheel 118 for rotating a shaft 120 about which the wheel 118 is secured. Extending from frame 69 is a support 122 through which the shaft 120 is rotatably mounted. A detecting means 124 including a leaf spring 126 is connected to support 122 and prevents the index wheel 118 from rotating more than one tooth distance each time the wheel is rotated by the pawl 110. Also connected to the shaft 120 is a calendar drum 128 which rotates with the shaft and indicates each half day of the week as shown. The shaft 120 is also rotatably connected to another support 130 which extends from the frame 69.

As shown in FIGS. 5–8, the shaft 120 extends through an aperture 134 in the board 88 and has rotatably mounted thereon a 7-day wheel 136, having a cam 136a corresponding to the weekend days, which is fastened to the shaft by a C-shaped mounting clip 138. A cam follower 140 including a spring 142 is connected to the board 88 and activates a plunger 144 of a switch 146. This switch 146 may close the circuit either for the weekday or weekend life cycle program.

In the operation of FIGS. 5–8, as the disc 95 is rotated by the shaft 32, one of the cams 96 or 98 will come in contact with the cam follower 102 each twelve hour period. As a result, rocker arm 100 will pivot in a counterclockwise direction about projection 64 against the bias of spring 106. This will cause the pawl 110 to be raised into one of the teeth of the index wheel 118 thereby rotating the shaft 120. When the shaft 120 rotates, the calendar wheel 128 also will rotate as does the 7-day wheel 136. As the wheel 136 rotates, the cam 136a will be positioned to contact the spring 142 of cam follower 140 to depress the plunger 144 and connect into the circuit to be described the program for, for example, the weekend cycle. When the weekend is over, spring 142 will ride down the cam 136a and release the plunger 144 to bring into circuit the program for the weekday cycle.

Furthermore, as the shaft 120 is rotated, calendar wheel 128 is indexed to indicate each half day of the week. A window (not shown) in FIG. 1 may be included above the top of clock face 22 through which may be seen the day of the week.

Figure 9:
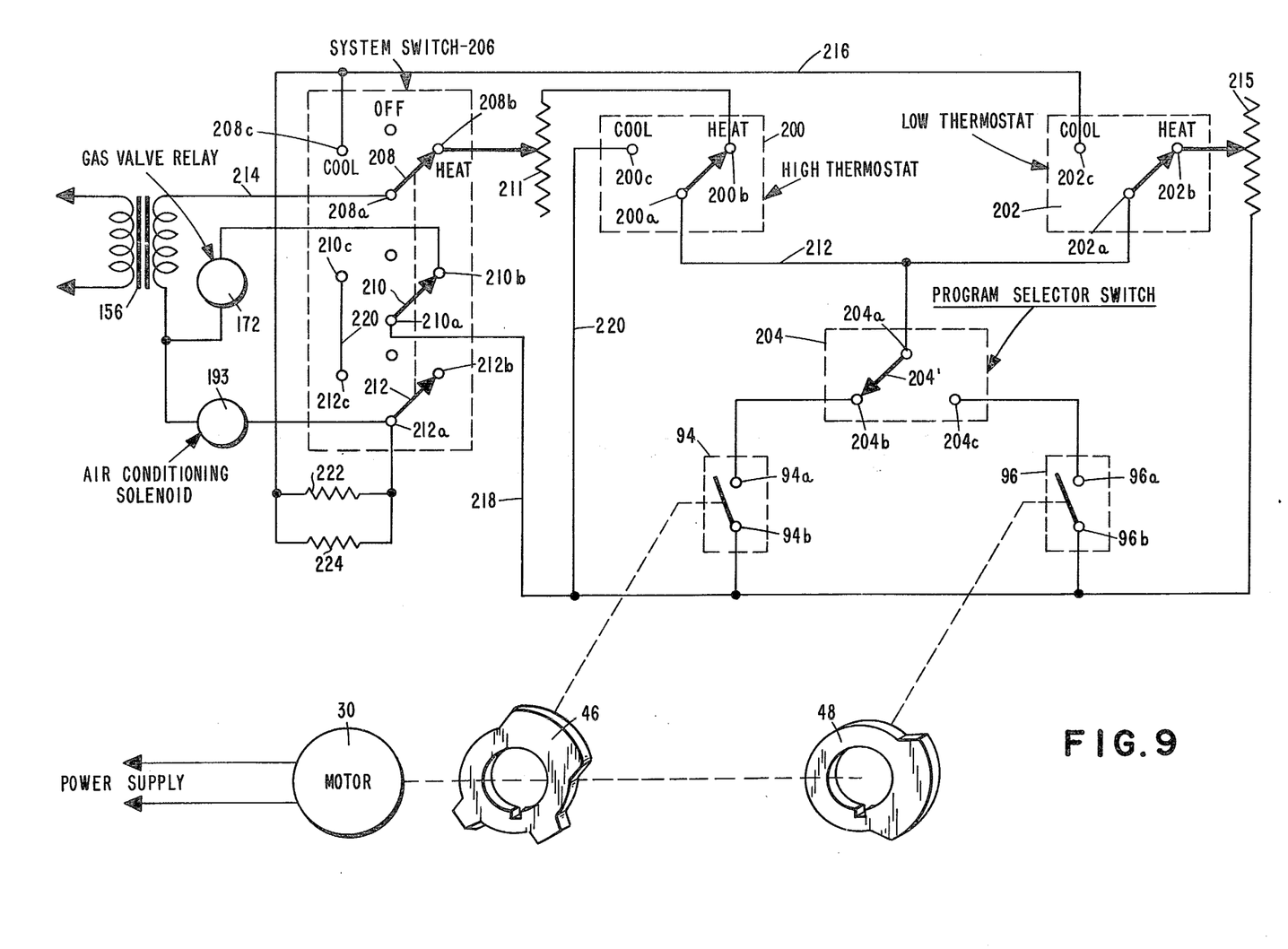
FIG. 9 is a schematic wiring diagram showing the connections of a programmable timer mechanism having two thermostats included therein.

FIG. 9 discloses a schematic wiring diagram of one embodiment of the present invention. In this figure, the programmable timer mechanism includes a high thermostat 200 for setting the higher temperature level and a low thermostat 202 for setting the low temperature level. The high thermostat 200 is used for setting the higher temperature during both the heating and cooling seasons, and the low thermostat 202 is used to set the lower temperature during both seasons. Contact 200a and 202a are connected to a contact 204a on a program selector switch 204, an arm 204' being provided on switch 204 for connecting contacts 200a and 202a of the high and low thermostats to contact 94a or 96a of reed switches 94 and 96 through contacts 204b and 204c respectively of switch 204. Reed switches 94 and 96 are operated by weekday programmable disc 46 and weekend programmable disc 48 respectively and, when closed, connect contacts 94b and 96b to either a gas relay 172 or an air conditioning solenoid 193 depending upon the setting of a system switch 206. The discs 46 and 48 are rotated by the motor 30 which is connected to a suitable power supply.

System switch 206 includes three gangs having switch arms 208, 210 and 212 respectively. Each arm connects a common contact to one of three other contacts depending upon whether the switch is in the OFF, HEAT or COOL position. Assuming, it is the heating season, the system switch would be placed in the HEAT position as shown in FIG. 9 so that arm 208 makes contact between contacts 208a and 208b, arm 210 connects contacts 210a and 210b and arm 212 connects contacts 212a and 212b. Power is supplied via transformer 156 through a lead 214 and arm 208 to an anticipator 211 which is a part of high thermostat 200. Anticipator 211 is provided, as is well known in the art, to prevent the room from overheating due to thermal lag.

Assuming that the ambient temperature is below the settings of both of the high and low thermostats, contact 200a will be connected to 200b and contact 202a to 202b. This would occur, for example, if the high thermostat 200 was set for a temperature of 70°, the low thermostat 202 was set for a temperature of 60° and the ambient temperature was 55°. In this case, the anticipator 211 would be connected through contacts 200b and 200a of high thermostat 200, line 212, contacts 202a and 202b and anticipator 215 of low thermostat 202 contacts 210a and 210b of switch 206, gas relay 172 and then back to the other side of the secondary transformer 156. Thus, as long as the temperature remains below the setting of the high and low thermostats, gas relay 172 will be energized and initiate heating of the room in which the thermostat has been placed.

If the ambient temperature is between the settings of the high and low thermostats, contacts 200a and 200b of the high thermostat 200 will be connected but contacts 202a and 202c of the low thermostat 202 will be connected, thermostat 202 having switched from heat to cool. For example, if the settings are 70° for the high thermostat 200 and 60° for the low thermostat 202 and the ambient temperature is 65°, the high thermostat 200 will be calling for heat whereas the low thermostat 202 will be calling for a reduction in temperature. In this case, the circuit can be traced from anticipator 211, contacts 200b and 200a, line 212 through program selector switch 204 to either reed switch 94 or 96 depending on whether switch 204 has been set for weekday or weekend operation. More specifically, if the program selector switch has been set for weekday operation, contacts 204a and 204b will be connected by switch arm 204' so that electrical contact will be made through reed switch 94 when cam 46 is in a position to close this switch. Alternatively, if the program selector switch arm 204' connects contacts 204a and 204c then the circuit is made through reed switch 96 depending upon the action of cam 48. Thus, gas relay 172 will be energized whenever either cam 46 or cam 48 is in a position to close its respective reed switch 94 and 96, the positions of cams 46 and 48 being controlled by the motor 30.

If the temperature of the air surrounding the thermostat is above the setting of high thermostat 200 contacts 200a and 200c will be connected as will contacts 202a and 202c thereby deenergizing gas relay 172 and shutting down the heating system.

During the summer season, the systems switch 206 is placed in the cool position so that contacts 208a, 210a and 212a are connected to contacts 208c, 210c and 212c respectively. Under these conditions, if the ambient temperature is below the settings of both the high and low thermostats, contacts 200a and 200b of high thermostat 200 and contacts 202a and 202b of low thermostat 202 are connected and the circuit is de-energized by switch 208. If the air in the room increases to a temperature between the two settings, contacts 202a and 202c of the low thermostat 202 will be connected while contacts 200a and 200b of the high thermostat 200 remain electrically connected. In this case, the electrical circuit can be traced from one side of the secondary transformer 156, lead 214, contact 208a, arm 208, contact 208c, line 216 of contacts 202c and 202a through program selector switch 204 to either reed switch 94 or 96. Contact 94b or 96b is connected through line 218 to contacts 210a and 210c of system switch 206, jumper 220 to contacts 212c and 212a of the system switch to air conditioning solenoid 193 thereby returning to the other side of the secondary of transformer 156. Thus, when the temperature is between the settings of the high and low thermostats and the system switch 206 is in the cool position, the air conditioning solenoid 193 is energized in accordance with the position of cam 46 or 48.

For temperatures above the settings of both the high and low thermostats, contacts 200a and 200c of the high thermostat 200 are connected as well as contacts 202a and 202c of the low thermostat 202. Thus, the electrical circuit is completed through lead 214, the top gang of switch 206, lead 216, contacts 202c and 202a of low thermostat 202, lead 212, contacts 200a and 200c of high thermostat 200, leads 220 and 218, the center gang of system switch 206, jumper 220, the lower gang of system switch 206, air conditioning solenoid 193 and back to the secondary of transformer 156.

Anticipators 222 and 224 are associated with the high and low thermostats 200 and 202, respectively and operate in the conventional manner. When system switch 206 is in the cool position, they are connected across the secondary of transformer 156 through the air conditioning solenoid 193.

The parallel resistance of anticipators 222 and 224 is high enough so that only a small current flows, and therefore, air conditioning solenoid 193 is not energized by this current.

The advantage of this circuit is that the same thermostats are used both during the heating and cooling seasons to set the maximum and minimum temperatures. That is, referring to FIG. 1, level 14 may be set to the minimum temperature desired and lever 16 to the maximum temperature regardless of whether the system switch 26 is in the HEAT or COOL position. With the system switch 206 in the OFF position, neither heating or cooling can occur.

Figure 10:
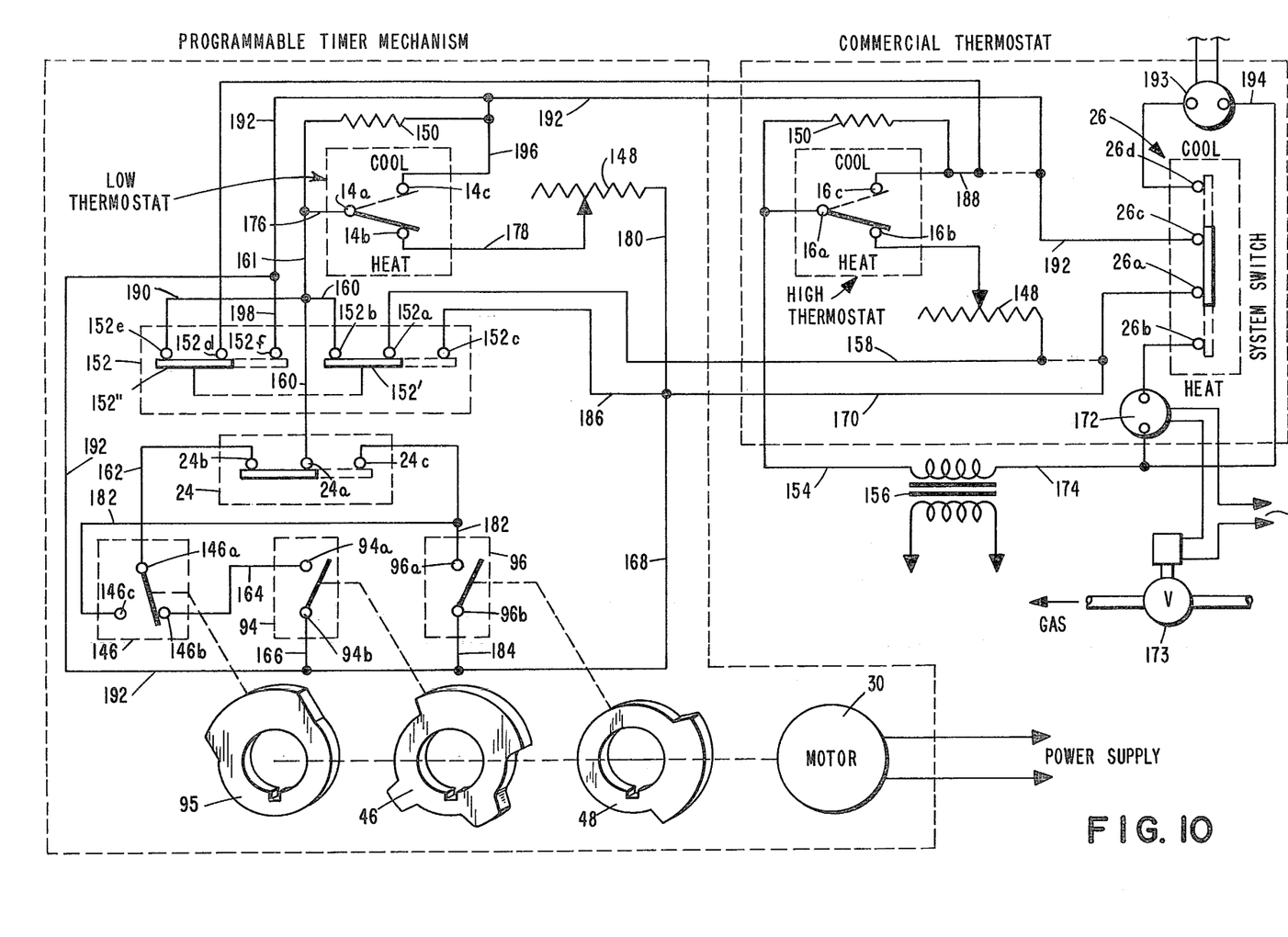
FIG. 10 is a schematic wiring diagram showing the connections of a programmable timer mechanism having one internal thermostat to a second external thermostat.

FIG. 10 shows a circuit in which the programmable timer mechanism includes a single thermostat for setting the lower temperature level with the lever 14 and in which the timer is connected to an existing commercial thermostat in a building for setting the high temperature level with lever 16. Alternatively, the present invention may be manufactured with only the timer mechanism shown in FIGS. 2–7 which can then be connected to a dual thermostat separately installed in a building.

FIG. 10 shows the weekday programmable disc 46, the weekend programmable disc 48, the automatic program selection disc 95, together with the corresponding reed switches 94, 96 and switch 146, respectively. Also shown is the manual program selection switch 24 which may be used, for example, to activate the weekend program on a weekday which is a holiday when the occupant of a house may follow the normal weekend life cycle. As illustrated, the discs are rotated by the motor 30 which is connected to a power supply.

Both the low and high thermostats have a pair of known anticipators 148, 150 connected as shown and both thermostats are coupled to the system selection switch 26 for heating or cooling. Also shown is a bypass switch 152 which is used to override either of the programs and which takes the control from the low thermostat and gives it to the high thermostat.

In describing the operation of FIG. 10, assume first that it is the heating season and the switch 26 has its contacts 26a and 26b connected as shown in dashed lines. Furthermore, it is assumed that the program selection switch 24 is in the automatic mode, i.e., disc 95 and switch 146 activate one of the weekday and weekend programs, and switch 152 does not override the programs. Under these conditions, switches 24 and 152 are in the position shown in solid lines in FIG. 10.

If the temperature in the house is between 60°F and 70°F, i.e., between the levels set by levers 14 and 16, then contacts 16a and 16b of the high thermostat will be closed while contacts 14a and 14b of the low thermostat will be open. Assuming that the time of day is the early evening so that a comfortable temperature of 70°F is required in the household, the following circuit will be completed to provide gas or other fuel to a burner to heat the house. This circuit will be made through line 154 connected to one side of a power source 156, contacts 16a, 16b, high thermostat anticipator 148, line 158, contacts 152a, 152b of the switch 152, line 160, contacts 24a, 24b of switch 24, line 162, contacts 146a 146b of switch 146 (for activating the weekday program), line 164, reed switch 94 whose contacts 94a, 94b will be closed, line 166, line 168, line 170, contacts 26a, 26b, gas relay 172, and line 174 to the other side of the power source 156. The closure of this circuit will energize the gas relay 172 to open a gas line valve 173 to supply gas to the burners of a furnace. When the temperature in the house goes above 70°F, contacts 16a, 16b will open to break this circuit and thereby close the gas vlave, preventing gas from flowing to the burners.

If it is the time of the weekday when a comfortable temperature of 60°F can be maintained, for example, when the house is not normally occupied or the occupants are sleeping, then reed switch 94 will be open and the low thermostat will control the flow of gas to the burners. When the temperature drops below 60°F, contacts 14a, 14b will be closed. Accordingly, a circuit will be made through line 154, contacts 16a, 16b, high thermostat anticipator 148, line 158, contacts 152a, 152b, line 160, line 161, line 176, contacts 14a, 14b, line 178, low thermostat anticipator 148, line 180, line 170, contacts 26a, 26b, gas relay 172, and line 174 to open the gas valve. When the temperature rises above 60°F at this time, contacts 14a, 14b will open and since reed switch 94 also is open, no further gas will be supplied to the burners to heat the house.

On the weekend, disc 95 will cause plunger 144 to be depressed, thereby closing contacts 146a, 146c of switch 146 activating the weekend program disc 48. During the time that a comfortable temperature of 70°F is required on the weekend, should the temperature fall below 70°F, the circuit will be closed through line 154, contacts 16a, 16b, high thermostat anticipator 148, line 158, contact 152a, 152b, line 160, contacts 24a, 24b, line 162, contacts 146a, 146c, line 182, contacts 96a, 96b of reed switch 96, line 184, line 168, line 170, contacts 26a, 26b gas relay 172 and line 174. If, during the weekend, it is the time of day when a comfortable temperature of 60°F may be maintained, then the same circuit will be closed as was described above in connection with the weekday life cycle when such 60°F temperature is maintained.

If, for some reason, it is a weekday but a weekend cycle is desired, such as when a holiday falls on a weekday, then program selection switch 24 may be moved to close contacts 24a, 24c, thereby activating the weekend program. When the higher temperature of 70°F is desired for the life cycle, the weekend program will be activated through contacts 24a, 24c rather than through contacts 24a, 24b and the switch 146 to bring the temperature to a comfortable level. When the lower temperature of 60°F can be maintained, the same circuit described above will be closed to enable the low thermostat to control the household temperature.

It also may be desirable at any time to remove the program control and allow the high thermostat to determine the temperature of the household. This may be readily accomplished by moving the bypass switch 152 to close contacts 152a, 152c, as shown in the dashed lines to override the programs provided by discs 46, 48. In this case, the circuit will be completed through line 154, contacts 16a, 16b high, thermostat anticipator 148, line 158, contacts 152a, 152c, line 186, line 170, contacts 26a, 26b, gas relay 172, line 174 and power supply 156.

A similar type of operation as described above occurs during the cooling season in which system switch 26 will have its contacts 26c, 26d closed as shown in dashed lines. For cooling purposes, though, the high thermostat is set low in relation to the low thermostat. Thus, lever 16 may remain at, for example, 70°F while lever 14 may be set to 78°F.

When the temperature rises above 70°F at a time during the weekday when a comfortable temperature of 70°F is to be maintained the circuit is closed through line 154, contacts 16a, 16c, line 188, contacts 152d, 152e of switch 152, line 190, line 160, contacts 24a, 24b, line 162, contacts 146a, 146b, line 164, contacts 94a, 94b, line 166, line 192, contacts 26c, 26d, air conditioning solenoid 193, line 194, line 174 and power supply 156.

When the temperature rises above 78°F contacts 14a and 14c will be closed. Accordingly, a circuit will be completed through line 154, contacts 16a, 16c, line 188, contacts 152d, 152e, line 190, line 161, line 176, contacts 14a, 14c, line 196, line 192, contacts 26c, 26d, solenoid 193, line 194, line 174 and power supply 156.

As can be seen from FIG. 10, switch 152 also provides a bypass to override the programs for the cooling system. This is accomplished by connecting contacts 152d, 152f, thereby bringing line 198, into circuit. Thus, when override is required, the circuit is closed through line 154, contacts 16a, 16c, line 188, contacts 152d, 152f, line 198, line 192, contacts 26c, 26d, solenoid 193, line 194, line 174 and power supply 156. As can also be seen, buttons 152' and 152'' are ganged to provide the override feature of both the cooling and heating systems.

It may also be noted that the high and low thermostats are connected in series as illustrated in FIG. 10 with the reed switches 94, 96 used as bypass switches to bypass the low thermostat. This arrangement makes it very easy to connect into a thermostat already located in a building with a minimum amount of wiring.

Finally, the programmable timer mechanism of the present invention including its own thermostat may be connected to a commercial thermostat such as the Honeywell T 872 model with minimum of difficulty to the installer through the use of a circuit board connected to a subbase of the present invention or flat flexible cable. The circuit board can be placed over and connected to Honeywell subbase model Q 672 of the commercial unit, with wires from the programmable timer mechanism having quick disconnect connectors or clips at their ends which plug into the circuit board. If a flat calbe is used, it can be placed over subbase Q 672.

What is claimed is:

1. A dual temperature control system for controlling the temperature of a zone comprising:
   a. first and second zone thermostats;
   b. a first programmable means for determining the time said first and second thermostats are effective to control temperature of said zone;
   c. a second programmable means for determining the time said first and second thermostats are effective to control temperature;
   d. means for automatically selecting which of said first and second programmable means determines when said thermostats are effective to control temperature; and
   e. means for manually selecting one of said first and second programmable means to determine when said thermostats are effective to control temperature.

2. The system of claim 1 further comprising means for overriding said first and second programmable means to control temperature by one of said thermostats.

3. The system of claim 2 wherein said first thermostat is effective to control temperature during a first time period determined by the selected programmable means and said second thermostat is effective to control temperature during a second time period determined by the selected programmable means.

4. The system of claim 3 wherein said first and second thermostats have switch contacts and are connected in a series circuit relationship so that when the temperature is sufficient to close the switch contacts of both thermostats, an electrical circuit is completed through both thermostats to maintain a particular temperature.

5. The system of claim 4 further comprising a circuit board for interconnecting said first and second thermostats.

6. A dual temperature control system for controlling the temperature of a zone comprising:
   a. first and second zone thermostats which have switch contacts and are connected in a series circuit relationship so that when the temperature is sufficient to close the switch contacts of both thermostats, an electrical circuit is completed through both thermostats to maintain a desired temperature of said zone;
   b. a first programmable means for determining the time said first and second thermostats are effective to control temperature;

c. a second programmable means for determining the time said first and second thermostats are effective to control temperature; and d. means for selecting one of said first and second programmable means to determine when said thermostats are effective to control temperature.

* * * * *